US005296318A

United States Patent [19]

Gozdz et al.

[11] Patent Number: 5,296,318

[45] Date of Patent: Mar. 22, 1994

[54] RECHARGEABLE LITHIUM INTERCALATION BATTERY WITH HYBRID POLYMERIC ELECTROLYTE

[75] Inventors: Antoni S. Gozdz, Tinton Falls; Caroline N. Schmutz, Eatontown; Jean-Marie Tarascon, Martinsville, all of N.J.

[73] Assignee: Bell Communications Research, Inc., Livingston, N.J.

[21] Appl. No.: 26,904

[22] Filed: Mar. 5, 1993

[51] Int. Cl.[5] ............ H01M 6/18

[52] U.S. Cl. ............ 429/192; 429/194

[58] Field of Search ............ 429/192, 194, 191, 197

[56] References Cited

U.S. PATENT DOCUMENTS 4,385,130 5/1983 Molinski et al. ............ 521/31
5,009,970 4/1991 Kronfli et al. ............ 429/192
5,041,346 8/1991 Giles ............ 429/192

FOREIGN PATENT DOCUMENTS 90598 10/1983 Japan ............ 429/192
3095802 4/1991 Japan .

OTHER PUBLICATIONS

G. Feuillade et al., "Ion-conductive macromolecular gels and membranes for solid lithium cells", *Journal of Applied Electrochemistry* 5 (1975) pp. 63–69.

E. Tsuchida et al., "Conduction of Lithium Ions in Polyvinylidene Fluoride and Its Derivatives-I", *Electrochemica Acta,* vol. 28, No. 5, pp. 591–595, (1983).

E. Tsuchida et al. "A mechanism of Ionic Conduction of Poly (Vinylidene Fluoride)-Lithium Perchlorate Hybrid Films", *Electrochemica Acta,* vol. 28, No. 6, pp. 833–837, (1983).

*Primary Examiner*—John S. Maples

*Attorney, Agent, or Firm*—Leonard Charles Suchyta; Lionel N. White

[57] ABSTRACT

A rechargeable battery comprises lithium intercalation compound electrodes and an interposed electrolyte of flexible polymer containing a lithium salt dissolved in a polymer-compatible solvent. Preferred components include tertiary lithium manganese oxide compound positive electrodes, carbon negative electrodes, and poly(vinylidene fluoride) copolymer electrolyte layers containing about 20 to 70% of a solution of lithium salt in a medium boiling solvent comprising such solvents as ethylene carbonate, propylene carbonate, and dimethyl carbonate. The electrolyte layers may be employed in the form of individual separator films or as a coated component of multilayer battery structures to provide electrical ionic conductivity up to about $10^{-3}$ S/cm.

18 Claims, 4 Drawing Sheets

VOLTS
5.0
4.0
3.0
2.0
1.0
0.0
0.2
0.4
0.6
0.8
1.0
X IN $Li_xMn_2O_4$

RECHARGEABLE LITHIUM INTERCALATION BATTERY WITH HYBRID POLYMERIC ELECTROLYTE

BACKGROUND OF THE INVENTION

The present invention relates to rechargeable battery cells in which ions of a source electrode material move between cell electrodes through an intermediate electrolyte during the charge/discharge cycles of the cell. More particularly, the invention relates to such cells in which the ion source is lithium, a lithium compound, or a material capable of intercalating lithium ions, and the electrolyte comprises a polymeric matrix which is ionically conductive by virtue of, for example, the incorporation of a dissociable lithium salt which can provide ionic mobility.

Early rechargeable lithium cells utilized lithium metal electrodes as the initial ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, as well as providing a means for preventing destructive contact between the electrodes of the cell. Sheets or membranes ranging from glass fiber filter paper or cloth to microporous polyolefin film or nonwoven fabric have been saturated with solutions of a lithium compound, such as $LiClO_4$, $LiPF_6$, or $LiBF_4$, in an organic solvent, e.g., propylene carbonate, diethoxyethane, or dimethyl carbonate, to form such separator elements. The fluid electrolyte bridge thus established between the electrodes has effectively provided the necessary $Li^+$ ion mobility at conductivities in the range of about $10^{-3}$ S/cm.

Although serving well in this role of ion conductor, these separator elements unfortunately comprise sufficiently large solution-containing voids that continuous avenues may be established between the electrodes, thereby enabling lithium dendrite formation during charging cycles which eventually leads to internal cell short-circuiting. Some success has been achieved in combatting this problem through the use of lithium-ion cells in which both electrodes comprise intercalation materials, such as lithiated manganese oxide and carbon (U.S. Pat. No. 5,196,279), thereby eliminating the lithium metal which promotes the deleterious dendrite growth. While providing efficient power sources, these lithium-ion cells cannot attain the capacity provided by lithium metal electrodes, however.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which is enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was only attainable with these polymer compositions at ambient conditions well above room temperature, however. Some improvement in the conductivity of the more popular poly(ethylene oxide) compositions has been reported to have been achieved by radiation-induced cross-linking (U.S. Pat. No. 5,009,970) or by meticulous blending with exotic ion-solvating polymer compositions (U.S. Pat. No. 5,041,346). Each of these attempts achieved limited success due to attendant expense and restricted implementation in commercial practice.

Some earlier examination of poly(vinylidene fluoride) polymer and related fluorocarbon copolymers with trifluoroethylene or tetrafluoroethylene revealed enhancement of ionic conductivity by a simpler incorporation of lithium salts and solvents compatible with both the polymer and salt components. This work by Tsuchida et al. (*Electrochimica Acta*, Vol. 28 (1983), No. 5, pp. 591–595 and No. 6, pp. 833–837) indicated, however, that the preferred poly(vinylidene fluoride) compositions were capable of exhibiting ionic conductivity above about $10^{-5}$ S/cm only at elevated temperatures, reportedly due to the inability of the composition to remain homogeneous, i.e., free of deleterious salt and polymer crystallites, at or below room temperature. Such limitations apparently led to the abandonment of attempts to implement these compositions in practical rechargeable cells.

The present invention provides a means for avoiding the disadvantages of prior rechargeable lithium battery compositions and constructions by enabling the ready and economical preparation of strong, flexible polymeric electrolyte materials which are functional over a range extending well below room temperature.

SUMMARY OF THE INVENTION

The rechargeable battery cells and component polymeric electrolytes of the present invention comprise a blend of poly(vinylidene fluoride) copolymer, lithium salt, and compatible medium-boiling solvent which maintains an homogeneous composition capable of forming an extensible, self-supporting film. The copolymer comprises about 75 to 92% by weight vinylidene fluoride and 8 to 25% hexafluoropropylene, a range in which the latter co-monomer limits the crystallinity of the final copolymer to a degree which ensures good film strength while enabling the retention of about 40 to 60% solvent for the lithium salt. Within this range of solvent, the 5 to 7.5% salt comprising the electrolyte film promotes an ionic conductivity of between about $10^{-5}$ and $10^{-3}$ S/cm, yet there is no evidence of solvent exudation which might lead to cell leakage. In an alternative utilization, a 50 to 100 μm thick copolymer film comprising generally the same composition, but devoid of the lithium salt, provides an effective and economical separator membrane which may be employed as in prior practices to construct battery cells in which lithium salt solution is added at the time of assembly. The salt readily migrates throughout the film body to provide substantially the same conductivity enhancement as achieved by the mixed electrolyte film.

Battery cells may be assembled of pre-constructed electrode and electrolyte elements, as in prior practices, or, more advantageously, these elements may be formed from coatable compositions of electrolyte and electrode materials. In this latter procedure, a terminal layer of aluminum foil, for example, is coated with a dispersion of intercalation electrode composition, e.g., a $LiMn_2O_4$ powder in a polymer matrix solution, which is dried to form the positive electrode. An electrolyte polymer composition of the present invention serves particularly well for this purpose, since matrix compatibility is ensured. A layer of the hybrid polymeric electrolyte is then formed on the positive electrode and a lithium foil and copper terminal foil are in turn pressed into the assembly to complete the cell structure. In a lithium-ion cell, a copper foil coated with carbon, e.g., petroleum coke or graphite, dispersed in an electrolyte polymer composition is substituted for the lithium metal foil.

BRIEF DESCRIPTION OF THE DRAWING

The present invention will be described with reference to the accompanying drawing of which.

DESCRIPTION OF THE INVENTION

Figure 1:
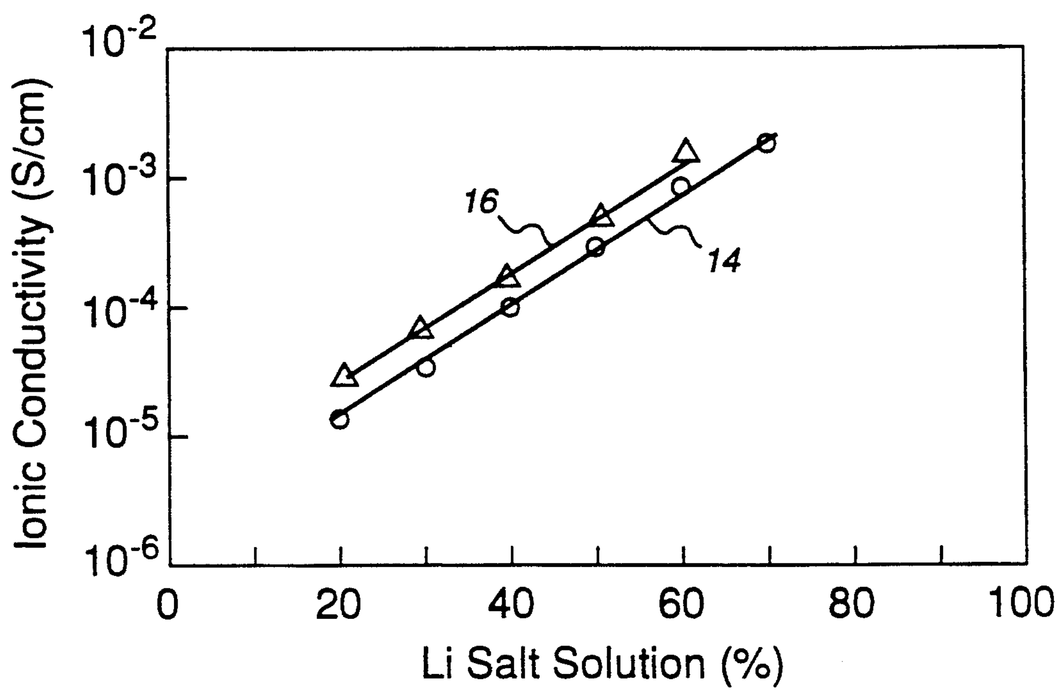
FIG. 1 is a graph tracing the ionic conductivity of embodiments of the present polymeric electrolyte as a function of the amount of retained lithium salt solution.

A number of commercially-available polyvinylidene fluoride (PVdF) polymers and copolymers were investigated for utilization in the polymeric electrolytes of the invention. Since the ready formation of self-supporting films or layers of polymeric electrolyte is of paramount importance in practical cell construction, attempts were initially made to cast these various polymer products as films from easily-managed solvent solutions at reasonable ambient conditions, i.e., from dissolution with no more than moderate heating to formation of a sturdy dry layer without excessive processing, such as extended radiation or annealing. Tetrahydrofuran was selected as the common solvent for the PVdF materials, as well as the medium-boiling solvents to be incorporated later, on the basis of its efficacy and acceptable ancillary properties, particularly in connection with the functioning of rechargeable lithium or Li-ion cells.

Samples of PVdF homopolymers (commercially available from Atochem North America under the trademark, Kynar) in the molecular weight ranges of about $155\times10^3$ and $535\times10^3$, respectively, were suspended at a wt. ratio of about 12.5% in a mixture of 75% tetrahydrofuran (THF) and 12.5% of an equipart mixture of the medium-boiling solvents ethylene carbonate (EC) and propylene carbonate (PC) which is typically used as the dispersion vehicle for the lithium salt in a complete electrolyte composition. Although dissolution of these samples was ultimately achieved after heating at about 60° C., the solutions gelled to an unworkable state after standing for a short time at room temperature, rendering these materials unsuitable for practical electrolyte use.

Despite this unsatisfactory showing, it was deemed prudent to reexamine the PVdF homopolymer under the conditions reported by Tsuchida et al. (earlier noted). The sample having the lower MW, i.e., in the range of the Tsuchida material, was dissolved in the described manner in a heated mixture of acetone and the EC/PC mixture which now contained $LiClO_4$ in 1M solution. The composite solution was cooled to room temperature and before the onset of solidification a portion was immediately spin cast onto a silicon disk and dried to a final thickness of about 0.1 mm. The resulting film exhibited a pronounced bloom or whitening indicative of the inhomogeneity resulting from polymer and salt crystallite formation. The film also exhibited low physical strength and split under moderate handling. Although the crystallite-disrupted surface of the film sample presented a somewhat difficult contact for the subsequent conductivity testing, values were obtained which confirmed the best Tsuchida measurements, i.e., in the range approaching $10^{-5}$ S/cm. This level of conductivity is well below the range of practical utility and, considered with the undesirable working and physical properties of the intermediate solution and coated film, highlights the unsatisfactory quality of the PVdF homopolymers for use in polymeric electrolytes. This conclusion appears to be supported by the lack of reported successes with these materials during the long time since the Tsuchida investigations.

The PVdF copolymers suggested by Tsuchida et al. as being less desirable than their preferred homopolymer were also examined. In particular, a sample of vinylidene fluoride-tetrafluoroethylene copolymer having about $245\times10^3$ MW was tested for solubility, coatability, and conductivity with a preferred $LiPF_6$ salt in the above-noted solvents. Although the conductivities of 40–60% medium-boiling solvent ratio compositions registered within the desirable range of $10^{-5}$ to $10^{-3}$ S/cm, their films continued to exhibit the unsatisfactory crystallite separation and structural inadequacy.

In the present invention, however, a group of PVdF copolymers has been discovered which meets the requirements for successful lithium battery cell polymeric electrolytes. The undesirably high crystallinity of the PVdF homopolymer may apparently be suppressed to an optimum degree by the copolymerization of vinylidene fluoride with about 8 to 25% hexafluoropropylene (HFP). It was found that below this lower limit the crystallinity of the primary monomer persists with resulting unmanageable coating solutions, unsatisfactory film texture and strength, and limited medium-boiling salt solution retention. Beyond the higher limit, on the other hand, while the solutions remain fluid at ambient room temperature and below, removal of the major coating vehicle, e.g., tetrahydrofuran (THF), fails to result in the formation of a self-supporting film, unless additional processing such as cross-linking under actinic radiation is undertaken.

Solid electrolyte compositions comprising VdF-HFP copolymers within the noted range were tested for conductivity and efficacy in rechargeable lithium and Li-ion cells. The following examples of test electrolyte and cell compositions were prepared under anhydrous conditions, typically with anhydrous reagents and in a helium environment, due to the extreme moisture sensitivity of the lithium salts.

EXAMPLE 1

A solid polymeric electrolyte film was prepared by casting a portion of the following coating composition onto a polished silicon wafer using a common spin-coating apparatus operating at 600 rpm for 2 sec. The film was allowed to dry at room temperature for about 10 min within the confines of the coating apparatus, in order to minimize uneven drying or flashing of the THF vehicle solvent, yielding a clear elastic film about 50 μm thick. The coating solution was prepared by suspending about 1.5 g of an 88:12 VdF:HFP copolymer of about $380\times10^3$ MW (Atochem Kynar FLEX 2801) in about 9 g of anhydrous THF and adding to this mixture about 1.5 g of a 1M solution of $LiPF_6$ in a 1:1 mixture by weight of ethylene carbonate (EC):propylene carbonate (PC). The completed mixture was warmed to about 60° C. for 30 min to facilitate dissolution and with occasional agitation a solution was obtained which retained its fluidity upon standing at room temperature for a number of hours.

The resulting film, comprising copolymer, EC/PC solvent, and $LiPF_6$ in a weight ratio of about 50:44.3:5.7, was readily removed from the coating substrate for conductivity testing according to the usual ac impedance method on common test equipment, e.g., a Hewlett-Packard computer-controlled HP4192A capacitance bridge operating over the frequency range of 5 Hz to 110 MHz. The film exhibited an ionic conductivity of about $4\times10^{-4}$ S/cm.

EXAMPLE 2

An electrolyte film coating composition was prepared according to Example 1 utilizing instead an 85:15 copolymer of VdF:HFP (Atochem Kynar FLEX 2750). Doctor blade coating at about 0.5 mm followed by ambient air drying produced an exceptionally clear, tough, elastic 0.1 mm film which provided a conductivity of about $3\times10^{-4}$ S/cm.

EXAMPLE 3

Indicative of other electrolyte film formation techniques which may be used with the present compositions, 55 and 50 parts by wt of the copolymers of Examples 1 and 2, respectively, were suspended, without THF vehicle solvent, in 45 and 50 parts of the EC/PC lithium salt electrolyte solution. The resulting swollen slurried masses were pressed at about 100° C. for 1 min between polished aluminum plates separated by 0.15 mm shims. After cooling to room temperature, the resulting clear, flexible films respectively exhibited conductivities similar to those obtained in the earlier examples.

EXAMPLE 4

A series of films was prepared according to the procedures of Example 1 with variations only in the percentage of the 1M $LiPF_6$ solution added to the coating composition and thus retained in the electrolyte film. These variations and the resulting room temperature ionic conductivities of the films are depicted in the graph of FIG. 1 as trace 14 (circles).

EXAMPLE 5

A second series of films was prepared as in Example 4 using a 1M solution of $LiAsF_6$ in the equipart mixture of EC/PC in place of the $LiPF_6$ solution. The variations in amounts of added salt solution and the resulting room temperature ionic conductivities of the films are depicted in the graph of FIG. 1 as trace 16 (triangles).

EXAMPLE 6

Figure 2:
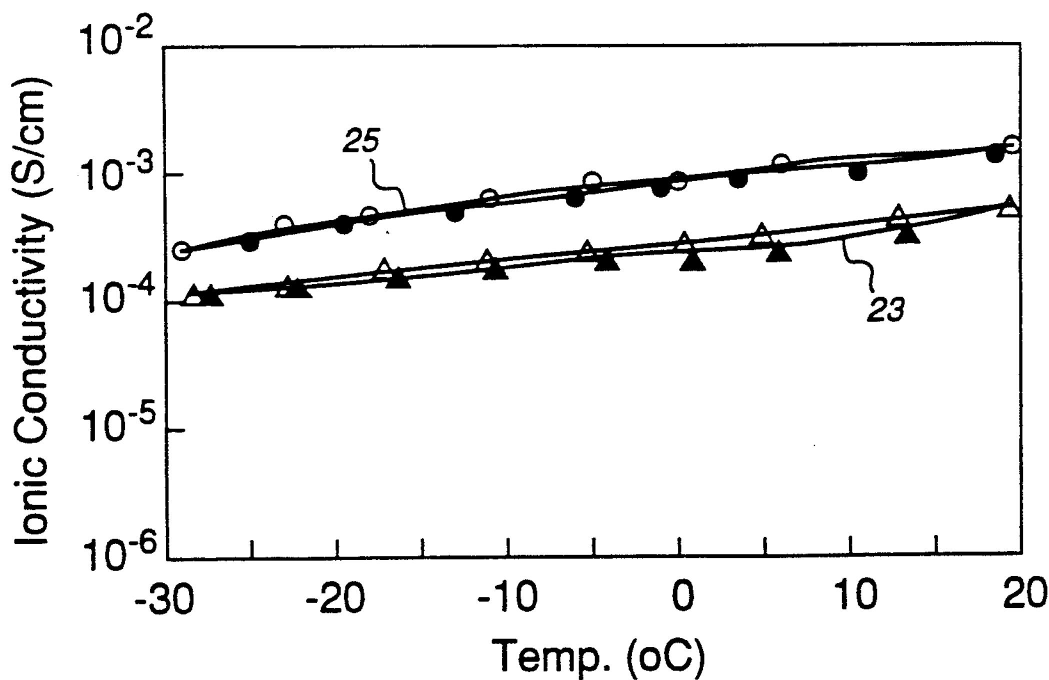
FIG. 2 is a graph tracing the ionic conductivity below room temperature of embodiments of the present polymeric electrolyte varying in the amount of retained salt solution.

A film was prepared according to the procedures of Example 1 with the exception that 1.2 g of the 1M $LiPF_6$ solution was added to the coating composition in order that the resulting film contained about 40% salt solution or about 5.1% $LiPF_6$. Conductivity measurements were then made while cycling the temperature of the film from about room temperature to −30° C. and return. The conductivities of the film are shown in FIG. 2 as trace 23 in which the cooling phase data points are indicated by open triangles and the warming phase points are indicated by filled triangles. As can be observed, the film substantially retained its homogeneity and resultant conductive efficacy over the entire range.

EXAMPLE 7

A film was prepared according to the procedures of Example 6 with the exception that 1.9 g of the 1M $LiPF_6$ solution was added to the coating composition in order that the resulting film contained about 63% salt solution or about 8.1% $LiPF_6$. Conductivity measurements were then made while cycling the temperature of the film from about room temperature to −30° C. and return. The conductivities of the film are shown in FIG. 2 as trace 25 in which the cooling phase data points are indicated by open circles and the warming phase points are indicated by filled circles. As can be observed, the film substantially retained its homogeneity and resultant conductive efficacy over the entire range.

EXAMPLE 8

A segment of a 0.1 mm thick film electrolyte film prepared from the composition of Example 1 was used as a separator/electrolyte element in place of an electrolyte solution-saturated glass paper to construct a "rocking chair" Li-ion battery such as is generally described in U.S. Pat. No. 5,196,279. For use as the positive electrode of the cell, a suspension of 5.6 parts by weight of the VdF-HFP copolymer of Example 1, 11.1 parts of powdered $LiMn_2O_4$, 1.4 parts of SS carbon black, 10.9 parts of 1M $LiPF_6$ in EC/PC, and 72.2 parts of THF was warmed for about 10 min at 60° C. to facilitate dissolution of the polymer and was then stirred at ambient room temperature to obtain a smooth paste. This paste was coated on an aluminum foil by means of a common doctor blade gapped at about 1.3 mm and air-dried to complete the electrode stock.

Figure 3:
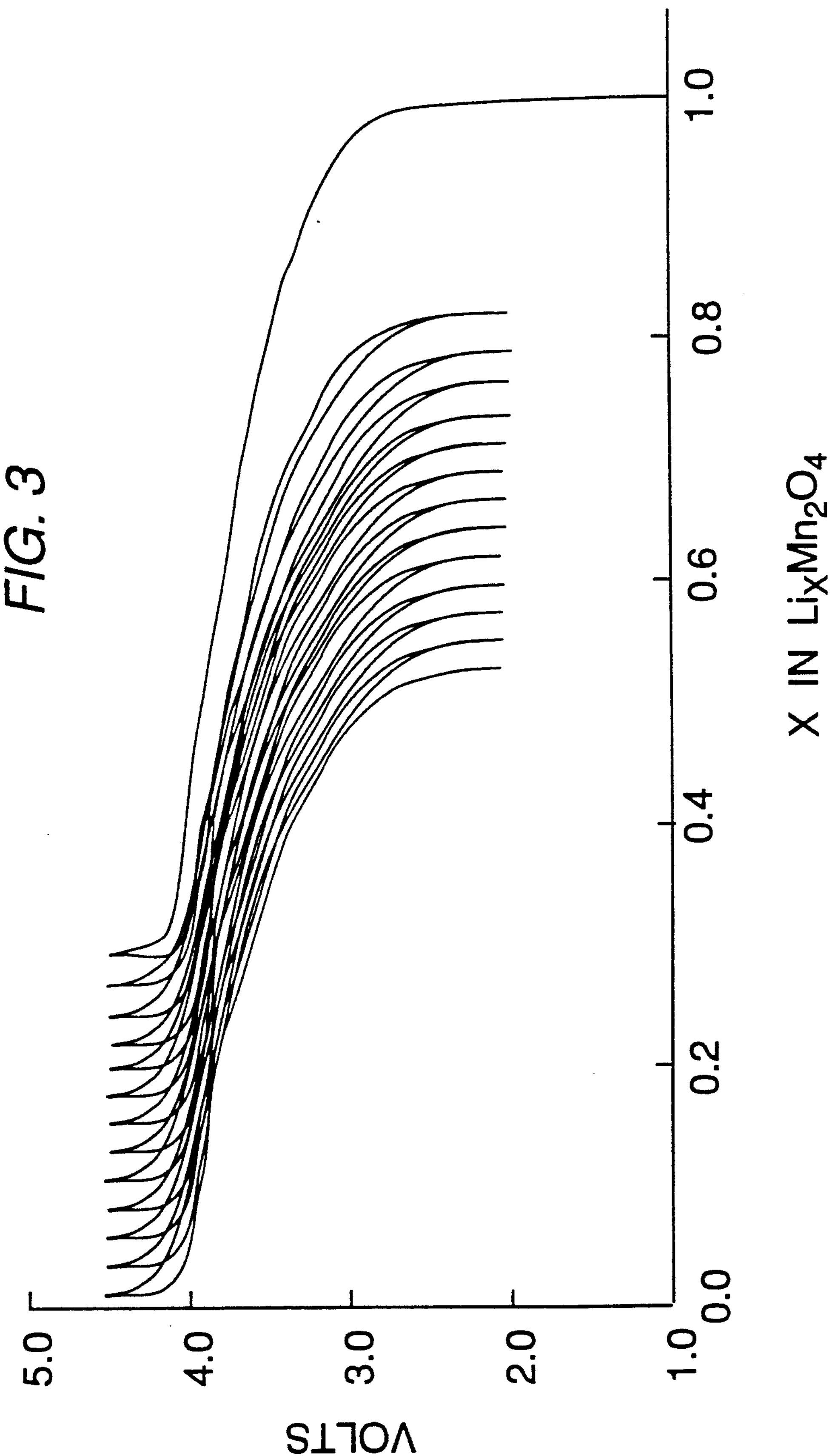
FIG. 3 is a graph tracing the recycling voltage as a function of intercalated lithium for a lithium-ion battery cell comprising a polymeric electrolyte film separator element of the present invention.

A matching negative electrode was prepared by similarly coating on a copper foil and air-drying a 0.6 mm layer of a paste of 5.6 parts VdF-HFP copolymer, 11.8 parts powdered petroleum coke, 0.7 parts SS carbon black, 10.9 parts the 1M $LiPF_6$:EC/PC solution, and 72.2 parts THF. The difference in the amounts of coated electrode materials was for the purpose of optimizing the ratio of active intercalation materials. The electrode and electrolyte layer materials were assembled in the usual manner in a Swagelock test cell which was run repeatedly through charge/discharge cycles. The cycling characteristics depicted in FIG. 3 attest to the efficacy of the polymeric electrolyte film.

EXAMPLE 9

A variation in the manner of constructing the battery cell of Example 8 provides a means for avoiding in great measure the moisture sensitivity of lithium electrolyte salts. Instead of including such salts in each of the electrolyte and electrode elements, the salts were eliminated from the electrode compositions in order that these materials may be more conveniently coated and stored at ambient conditions. An increased amount of the salt was then included in the electrolyte film to provide for diffusion into the electrode elements after cell assembly. Thus about 9.7 parts of a 1:1 mixture of EC/PC was substituted for the $LiPF_6$ solution in the electrode coating compositions, and about 1.7 g of a 2M $LiPF_6$ solution was used in preparing the electrolyte film. The resulting cell assembly performed similar to that of Example 8.

EXAMPLE 10

Figure 4:
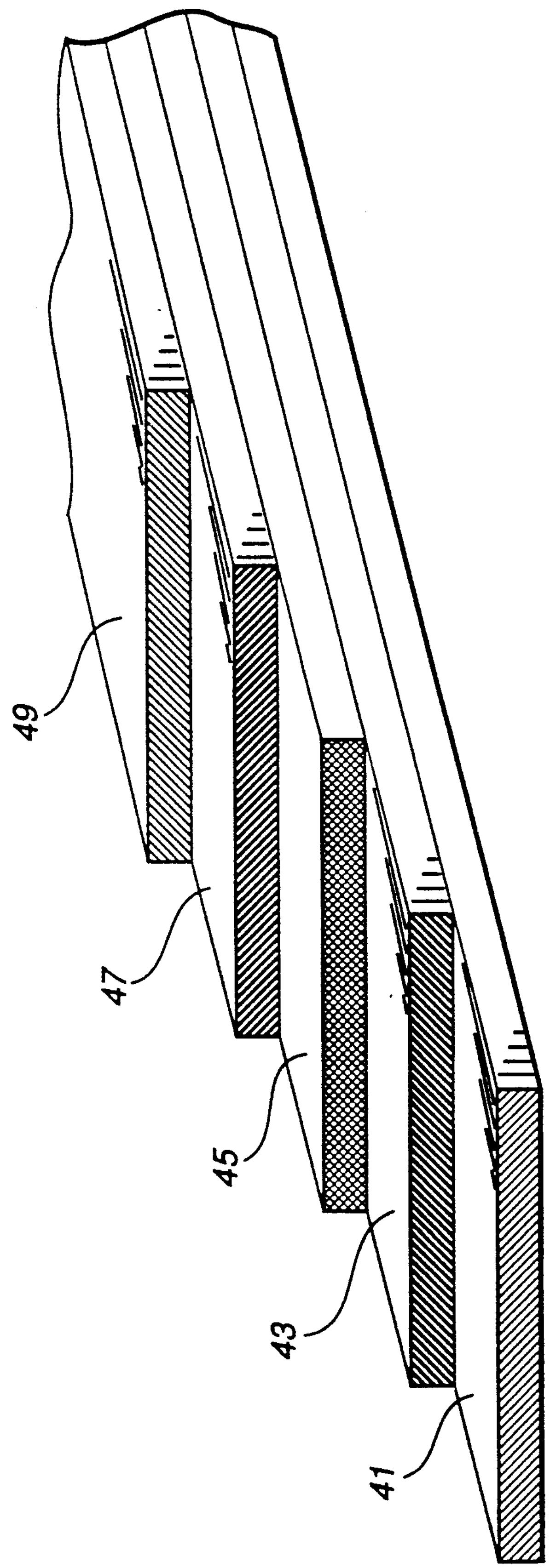
FIG. 4 is a diagrammatic representation of a composite multilayer Li-ion battery cell utilizing the coatable polymeric electrolyte of the present invention.
Figure 5:
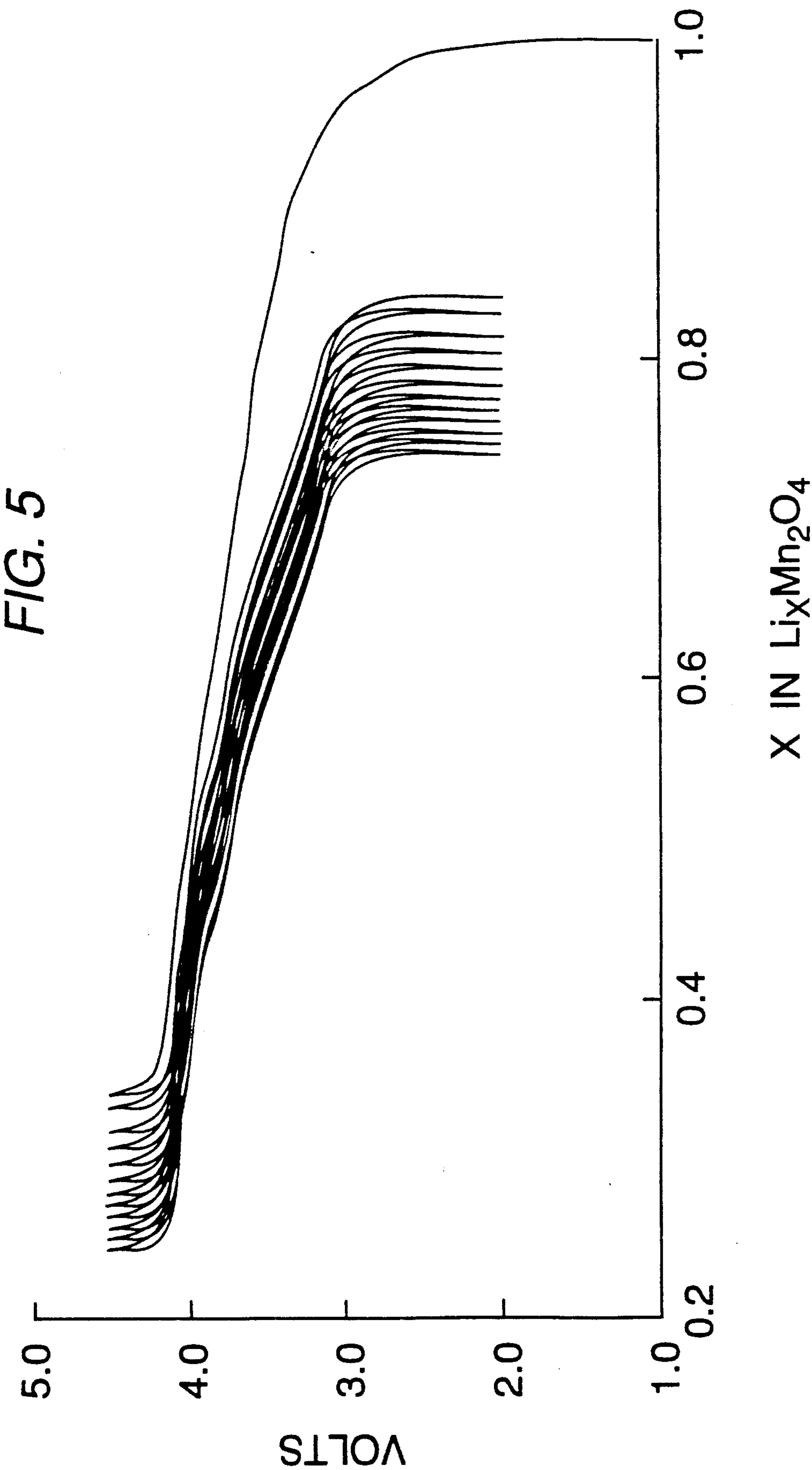
FIG. 5 is a graph tracing the recycling voltage as a function of intercalated lithium for a composite Li-ion battery cell of FIG. 4.

The compositions of Examples 1 and 8 were used to prepare an integrated cell by coating each in turn to form the multi-layer assembly depicted in FIG. 4. An aluminum collector foil 41 was coated with the $LiMn_2O_4$ composition of Example 8 and dried to form positive electrode layer 43. The polymer/salt composition of Example 1 was then coated upon the positive electrode layer with a 0.5 mm gap doctor blade and dried to form a solid polymer electrolyte layer 45 of about 0.1 mm thickness. The negative electrode composition of Example 8 was then applied and dried to form electrode 47. A copper collector foil 49 was then overlaid upon electrode 47 to complete the elements of a working cell whose cycling characteristics are plotted in FIG. 5.

The copolymer electrolyte materials of the present invention may be successfully compounded with any of the numerous components used in liquid electrolyte solutions. Notably, there may be employed other medium-boiling organic solvents such as dimethyl carbonate, diethoxyethane, diethyl carbonate, dimethoxyethane, and dipropyl carbonate. Other useful lithium salts include $LiClO_4$, $LiN(CF_3SO_2)_2$, $LiBF_4$, $LiCF_3SO_3$, and $LiSbF_6$ which may also be employed in solution concentrations of between about 0.5 and 2M. Of particular utility are the exceptional ethylene carbonate/dimethyl carbonate compositions of $LiPF_6$ and mixtures with $LiBF_4$ described in U.S. Pat. No. 5,192,629. While the above examples relate the simpler and more practical methods of processing associated with the preferred fluid coating compositions, it should be apparent to the skilled artisan that the present invention may take other forms to accommodate individual practices. For example, the high-ratio HFP copolymer solution compositions which fail to form adequate self-supporting films may be successfully employed in coating processes which include cross-linking operations, e.g., by means of actinic radiation. These and other variants are likewise to be included within the scope of the invention as set out in the appended claims.

What is claimed is:

1. A solid electrolyte for a rechargeable lithium intercalation battery cell comprising a dissociable lithium salt dispersed in a polymeric matrix characterized in that said electrolyte comprises a substantially self-supporting film of a copolymer of vinylidene fluoride with 8 to 25% by weight hexafluoropropylene, said film having homogeneously distributed therein 20 to 70% by weight of a solution of at least one lithium salt in a medium-boiling solvent.

2. An electrolyte according to claim 1 characterized in that said lithium salt is selected from the group consisting of $LiPF_6$, $LiAsF_6$, $LiClO_4$, $LiN(CF_3SO_2)_2$, $LiBF_4$, $LiCF_3SO_3$, and $LiSbF_6$.

3. An electrolyte according to claim 1 characterized in that said solvent is selected from the group consisting of ethylene carbonate, propylene carbonate, dimethyl carbonate, diethoxyethane, diethyl carbonate, dimethoxyethane, dipropyl carbonate, and mixtures thereof.

4. An electrolyte according to claim 1 characterized in that a) said lithium salt is selected from the group consisting of $LiPF_6$, $LiAsF_6$, $LiClO_4$, $LiN(CF_3SO_2)_2$, $LiBF_4$, $LiCF_3SO_3$, and $LiSbF_6$; and b) said solvent is selected from the group consisting of ethylene carbonate, propylene carbonate, dimethyl carbonate, diethoxyethane, diethyl carbonate, dimethoxyethane, dipropyl carbonate, and mixtures thereof.

5. An electrolyte according to claim 1 characterized in that said copolymer contains 12 to 20% by weight hexafluoropropylene.

6. An electrolyte according to claim 4 characterized in that said copolymer contains 12 to 15% by weight hexafluoropropylene.

7. An electrolyte according to claim 6 characterized in that said film comprises 40 to 60% by weight of said lithium salt solution.

8. A rechargeable lithium intercalation battery cell comprising a positive electrode, a negative electrode, and an ionically conductive solid electrolyte disposed between said electrodes characterized in that said electrolyte comprises a substantially self-supporting film of a copolymer of vinylidene fluoride with 8 to 25% by weight hexafluoropropylene, said film having homogeneously distributed therein 20 to 70% by weight of a solution of at least one lithium salt in a medium-boiling solvent.

9. A battery cell according to claim 8 characterized in that said negative electrode comprises a material selected from the group consisting of lithium, lithium alloys, and carbon.

10. A battery cell according to claim 9 characterized in that said positive electrode comprises a lithium intercalation compound.

11. A battery cell according to claim 8 characterized in that said electrolyte film comprises an individual separator element interposed between said electrodes.

12. A battery cell according to claim 8 characterized in that said electrolyte film comprises a layer coated on at least one of said electrodes.

13. A battery cell according to claim 8 characterized in that said lithium salt is selected from the group consisting of $LiPF_6$, $LiAsF_6$, $LiClO_4$, $LiN(CF_3SO_2)_2$, $LiBF_4$, $LiCF_3SO_3$, and $LiSbF_6$.

14. An electrolyte according to claim 8 characterized in that said solvent is selected from the group consisting of ethylene carbonate, propylene carbonate, dimethyl carbonate, diethoxyethane, diethyl carbonate, dimethoxyethane, dipropyl carbonate, and mixtures thereof.

15. An electrolyte according to claim 8 characterized in that said lithium salt is selected from the group consisting of $LiPF_6$, $LiAsF_6$, $LiClO_4$, $LiN(CF_3SO_2)_2$, $LiBF_4$, $LiCF_3SO_3$, and $LiSbF_6$; and said solvent is selected from the group consisting of ethylene carbonate, propylene carbonate, dimethyl carbonate, diethoxyethane, diethyl carbonate, dimethoxyethane, dipropyl carbonate, and mixtures thereof.

16. An electrolyte according to claim 15 characterized in that said copolymer contains 12 to 20% by weight hexafluoropropylene.

17. An electrolyte according to claim 16 characterized in that said copolymer contains 12 to 15% by weight hexafluoropropylene.

18. An electrolyte according to claim 17 characterized in that said film comprises 40 to 60% by weight of said lithium salt solution.

* * * * *